United States Patent [19]

Jones

[11] 3,926,679

[45] Dec. 16, 1975

[54] PHENOLIC RESIN AND BATTERY SEPARATOR IMPREGNATED THEREWITH

[75] Inventor: Robert T. Jones, Pelham, Mass.

[73] Assignee: Monsanto Company, St. Louis, Mo.

[22] Filed: Jan. 9, 1974

[21] Appl. No.: 432,111

[52] U.S. Cl. ................................. 136/146; 136/148
[51] Int. Cl.² .......................................... H01M 2/14
[58] Field of Search ............ 136/146, 148; 162/165, 162/182

[56] References Cited
UNITED STATES PATENTS

| | | | |
|---|---|---|---|
| 2,543,137 | 2/1951 | Uber | 136/146 |
| 2,662,106 | 12/1953 | Uhlig et al. | 136/146 |
| 2,747,009 | 5/1956 | Kirkwood et al. | 136/146 X |
| 2,773,114 | 12/1956 | McAuslan | 136/146 |
| 3,036,950 | 5/1962 | Martin | 136/182 X |
| 3,239,381 | 3/1966 | O'Connell | 136/146 |
| 3,297,638 | 1/1967 | Beaulieu | 136/146 X |
| 3,347,809 | 10/1967 | Tomaino | 136/146 X |
| 3,536,796 | 10/1970 | Rock | 136/146 X |

OTHER PUBLICATIONS

Kirk–Othmer, Encyclopedia of Chemical Technology, Second Edition, Vol. 19, pp. 531–535.

*Primary Examiner*—L. Dewayne Rutledge
*Assistant Examiner*—John F. Niebling
*Attorney, Agent, or Firm*—R. Bruce Blance; Edward P. Graham; James C. Logomasini

[57] ABSTRACT

Battery separators comprising a cellulose substrate thoroughly impregnated with an admixture of resole resin and a polyol antimigratory agent. The resole resin is a one-stage resin with a formaldehyde to phenol mol ratio between 1.6:1 and 2.8:1 and a molecular weight in the range of 130 to 300. After the cellulose substrate is impregnated with the admixture, it is heated to advance the resole to the infusible state. The substrate exhibits improved oxidation resistance in an acidic oxidation environment.

11 Claims, No Drawings

PHENOLIC RESIN AND BATTERY SEPARATOR IMPREGNATED THEREWITH

FIELD OF THE INVENTION

This invention relates to an improved composition of a phenol-aldehyde resin containing an anit-migratory agent and to a cellulosic battery separator impregnated with the composition.

THE PRIOR ART

Permeable cellulosic battery separators are used extensively in batteries of either the conventional wet-lead-acid type or the so-called "dry charge" lead-acid type. It is necessary that the structures thereof be protected from attack by the acid employed in the batteries. Therefore, when cellulosic battery separators are employed, they consist of cellulosic sheets impregnated with a phenol-aldehyde type of resin, which resin, when advanced to the infusible state, protects the fibers of the cellulosic sheet from attack by the acid. Because of the tendency of phenol-aldehyde resins to migrate during the drying and curing step when the molar ratio of aldehyde to phenol is greater than 1.5:1, the prior art battery separators have been generally limited to phenol-aldehyde resins with a molar ratio of less than 1.5:1. Migration is undesirable since it leads to non-uniform resin distribution within the cellulosic sheets and imparts to the sheets non-uniform resistance to degradation during use in a lead-acid battery, manifested in perforation and delamination of the separator. However, battery separators comprising cellulosic sheets impregnated with phenol-aldehyde resins containing an aldehyde to phenol molar ratio of less than 1.5:1 are generally deficient in oxidation resistance so that they degrade in the oxidizing environment of a lead-acid battery and the service life of the battery is thus diminished.

A need, therefore, exists for phenol-aldehyde resin compositions which resist migration within cellulose substrates and impart to cellulosic battery separators improved oxidation resistance and resistance to acid degradation. A further need exists for cellulosic battery separators with improved oxidation resistance and resistance to acid degradation

SUMMARY OF THE INVENTION

The above-mentioned needs in the prior art are fulfilled by the present invention which provides phenol-aldehyde resins to be used in impregnation of cellulosic substrates for use as battery separators. The phenolaldehyde resins are A-stage resoles of number average molecular weight in the range of 130 to 300 with a combined aldehyde to phenol mol ratio in the range of 1.6:1 to 2.8:1, containing less than 4 weight percent of free aldehyde and between 7 and 32 parts by weight of an anti-migratory agent per 100 parts by weight of resin solids, wherein the anti-migratory agent is selected from the group consisting of ethylene glycol, glycerol, erythritol, mannitol, sorbitol, and polyethylene glycols of nubmer average molecular weight less than 200.

A further aspect of the invention provides cellulosic battery separators comprising cellulosic sheets impregnated with a phenol-aldehyde resin which is an A-stage resole of number average molecular weight in the range of 130 to 300 with a combined aldehyde to phenol mol ratio in the range of 1.6:1 to 2.8:1, containing less than 4 weight percent of free aldehyde and between 7 and 32 parts by weight of an anti-migratory agent selected from the group consisting of ethylene glycol, glycerol, erythritol, mannitol, sorbitol, and polyethylene glycols of number average molecular weight less than 200 per 100 parts by weight of resin solids, wherein the phenol-aldehyde resin has been advanced to the infusible state.

A further aspect of the invention provides a process for the manufacture of cellulosic battery separators of improved oxidation resistance comprising admixing an anit-migratory agent selected from the group consisting of ethylene glycol, glycerol, erythritol, mannitol, sorbitol and polyethylene glycols of number average molecular weight less than 200 with an A-stage resole of number average molecular weight in the range of 130 to 300, a combined aldehyde to phenol mol ratio in the range of 1.6:1 to 2.8:1 and a free aldehyde content of less than 4 weight percent, impregnating the cellulosic sheet with the admixture and heating the impregnated sheet to dry it with cure the resole.

A further aspect of the invention provides a process for the manufacture of cellulosic battery separators of improved oxidation resistance comprising swelling a cellulosic substrate with an agent selected from the group consisting of ethylene glycol, glycerol, erythritol, mannitol, sorbitol and polyethylene glycols of number average molecular weight less than 200, impregnating the swollen cellulosic substrate with an A-stage resole of number average molecular weight in the range of 130 to 300, a combined aldehyde to phenol mol ratio in the range of 1.6:1 to 2.8:1 and a free aldehyde content or less than 4 weight percent, and heating the impregnated sheet to dry it and cure the resole.

PREFERRED EMBODIMENTS

Phenol-aldehyde resins useful in the practice of the present invention are A-stage resole resins of number average molecular weight in the range of 130 to 300 with a combined aldehyde to phenol ratio in the range of 1.6:1 to 2.8:1. The preferred range is 1.7:1 to 2.3:1 to obtain low molecular weight which is associated with a reduced degree of migration and to impart superior oxidation resistance to the battery separator. The combined aldehyde to phenol ratio is the mol ratio of reacted aldehyde to total phenol in the resole.

The one-stage resin is prepared by basic catalysis of the aldehyde phenol reaction, for example, with catalysts selected from the group consisting of alkali metal hydroxides. The reaction is continued until the free aldehyde content is reduced to less than 4 percent. At the same time, because of the high ratio of aldehyde to phenol in the reaction mixture, reduction of the free aldehyde to this low level causes a reduction in free phenol to less than 4 percent of the resole. The resin may be recovered in organic solvent or in water.

Typical examples of phenol-aldehyde resins which can be employed in the practice of this invention are phenol-formaldehyde, resorcinol-formaldehyde, catechol-formaldehyde, phenol-acetaldehyde, and alkylated phenol-formaldehyde resins having an alkyl group containing 1–3 carbon atoms, for example, cresol-formaldehydes, etc. The preferred resoles are phenol-formaldehyde resins.

The anti-migratory agent employed herein is a polyol selected from the group consisting of ethylene glycol, glycerol, erythritol, mannitol, sorbitol and polyethylene glycols of number average molecular weight less than 200. Between 7 and 32 parts by weight of anti-migratory agent are used with 100 parts by weight of resole resin solids. The preferred range is between 9 and 16 parts by weight of anti-migratory agent per 100 parts by weight of resole resin solids so that appreciable anti-migratory effect may be achieved without excessive swelling of the cellulose substrate.

The anti-migratory agent is applied to the cellulosic substrate in admixture with the resole resin by thorough impregnation of the substrate with a solution of the admixture of resole and anti-migratory agent containing a concentration of admixture which provides the desired pick up. The treated cellulosic substrate is squeezed gently to remove excess solution, dried to remove excess solvent and is then subjected to a temperature of about 200°F. to about 500°F. in order to advance the phenol-aldehyde resin to an infusible state. The time of exposure of the treated cellulosic sheet to these temperatures will vary from approximately 30 minutes at 200°F. to at least one minute at 500°F. In addition, the cellulosic battery separator is generally ribbed to increase its resistance to degradation during use thereof in a lead-acid battery. Generally, it is desirable to impregnate the cellulosic sheet with about 20–50 weight percent of the resin composition of this invention.

Alternatively, the cellulosic substrate is first treated with the anti-migratory agent alone by thorough impregnation to swell the cellulosic fibers, and secondly in a separate operation it is impregnated with the resole solution. In another alternative, the cellulose filbers are swollen with the anti-migratory agent before being laid down to form the cellulosic substrate which is then impregnated with the resole solution.

The cellulosic substrate is treated with the phenol-aldehyde resin by either the wet-web saturation method or the dry-web method. When the wet-web method is used, it is preferred to apply the resin-in-water solution and as a practical limit the water tolerance or dilutability of the resole should be at least 5. The dilutability is the number of volumes of water added to one volume of the liquid resole resin at 25°C. to produce a slight permanent haze in the aqueous solution.

Although the preferred battery separator employed in the practice of this invention is a cellulosic permeable structure having a Gurley porosity of about 1-25 seconds measured with a 5-ounce cylinder and a one-fourth square inch orifice, other battery separator structures may be prepared from substrates of cellulose in admixture with other organic fibrous materials, glass fibers or diatomaceous earth.

In the evaluation of resole resin compositions and battery separators manufactured therefrom, two tests are useful; namely, the migration test and the oxidation resistance test.

In the migration test, a 30 mil cellulosic sheet of paper is saturated by dipping it in resin solution and passing it through untensioned squeeze rolls. It is then dried for 30 minutes at 170°C. in a circulating air oven. At the end of this time, the sheet is removed from the oven and examined for resin migration. Examination of a cross-section reveals the degree of uniformity of distribution of resin throughout the sheet. The resins are graded on a scale of 1–10; 1 denoting little migration and 10 denoting excessive migration.

In the oxidation resistance test, an oxidation solution containing 10 grams of potassium dichromate and 56 grams of sulfuric acid in 1 liter of water is prepared. 275 Milliliters of the oxidation solution is added to a beaker for each gram of cured battery separator to be tested. The beaker is covered with a watch glass, placed on a hot-plate and heated to a gentle boil. A weighed sample is carefully placed into the solution. The liquid level is marked and maintained constant by addition of boiling water at frequent intervals. The solution is refluxed gently for three hours. It is then cooled, water is added and a pre-weighed 60 mesh stainless steel screen is placed over the mouth of the beaker and the solution is poured off. The beaker is carefully washed to remove all traces of residue and the washings are run through the screen. The residue on the screen is washed copiously with water to remove all traces of oxidizing solution. (Incomplete washing will give erroneous results since acid will char the residue when it is being dried.) The screen is dried in an oven for 10 minutes at 120°C., then cooled in a dessicator. The weight of the residue is determined and the weight loss is calculated from the formula:

$$\% \text{ Weight Loss} = \frac{\text{Initial Wt.} - \text{Wt. After Oxidation}}{\text{Initial Wt.}} \times 100$$

In addition to these tests, service life tests are run on assembled 12 volt batteries and after 350 charge discharge cycles, the separators are examined for perforation, delamination, surface erosion, and appearance.

The resole resin may also contain antioxidants, surface active agents, plasticizers and other adjuncts without departing from the scope of the invention.

The following examples are set forth in illustration of this invention and should not be construed as limitations thereof. Unless otherwise indicated, all parts and percentages are given in terms of parts by weight.

EXAMPLE 1

A one-stage water-dilutable resole is prepared by condensing 1.5 moles formaldehyde per mol of phenol in the presence of a sodium hydroxide catalyst. The catalyst is removed and the final resin product is diluted to a resin solids content of about 40 weight percent.

EXAMPLE 2–8

Similarly, a series of one-stage water-dilutable resoles is prepared by condensing formaldehyde with phenol. Data for the resoles are presented in Table I.

TABLE I

| | RESOLE RESIN DATA | | | |
|---|---|---|---|---|
| Resole | Combined Formaldehyde to Phenol Mol Ratio | Number Average Molecular Weight | Water Dilutability | Solids, % |
| 1 | 1.45 | 150 | >50 | 40 |
| 2 | 1.60 | ~160 | >50 | 40 |
| 3 | 1.78 | 167 | >50 | 40 |
| 4 | 1.94 | 177 | >20 | 40 |
| 5 | 2.35 | 215 | >20 | 40 |
| 6 | 2.45 | 240 | >20 | 40 |
| 7 | 1.94 | ~200 | 7 | 40 |
| 8 | 1.50 | ~170 | 9 | 40 |

EXAMPLES 9–16

These examples are set forth to illustrate the effect of cellulose swelling agents on the degree of migration of resole during the drying and curing of an impregnated cellulose substrate and the oxidation resistance of the resulting impregnated cellulose substrate.

Resin compositions of Table I are admixed with ethylene glycol, glycerol, sorbitol, resorcinol and urea. The admixtures are used to treat 30 mil permeable fibrous cellulosic sheets by hand-dipping the sheets in the resin compositions until the samples are thoroughly impregnated with the admixtures. The cellulosic sheets have a Gurley porosity of about five seconds measured with a 5-ounce cylinder and a one-fourth square inch orifice. The treated samples are squeezed lightly by one pass through rubber squeeze rolls and then subjected to a temperature of about 180°C. for 10 minutes. The pick up is approximately 40 percent of the weight of the impregnated sheet. The samples are evaluated for oxidation resistance. The resins are evaluated for migration as previously described. The data are presented in Table II wherein it is observed that polyols reduce the degree of migration and improve the oxidation resistance whereas of the other cellulose swelling agents, resorcinol increases the degree of migration and urea causes a sharp decrease in oxidation resistance.

TABLE II

| Ex. | Resole Ex. No. | Anti-migratory Agent | A.M.A., parts per 100 parts Resole Solids | Oxidative Weight Loss,% | Migration, Rating |
| --- | --- | --- | --- | --- | --- |
| 9 | 4 | none | 0 | 15 | 6 |
| 10 | 4 | ethylene glycol | 16 | 14 | 4 |
| 11 | 4 | glycerol | 8 | 11 | 5 |
| 12 | 6 | none | 0 | 11 | 8 |
| 13 | 6 | ethylene glycol | 16 | 8 | 7 |
| 14 | 6 | sorbitol | 8 | 10 | 7 |
| 15 | 6 | resorcinol | 16 | 11 | 9 |
| 16 | 6 | urea | 16 | 60 | 8 |

EXAMPLES 17–19

The resin composition of Example 5 is admixed with erythritol, mannitol and a polyethylene glycol of number average molecular weight 150 to provide samples of resin containing 16 parts of the respective additives per 100 parts of resin solids. In each case, improvement in the uniformity of impregnation of 30 mil permeable fibrous cellulosic sheet is observed in cured sheets impregnated with these samples in comparison with cured sheet impregnated with the resin composition of Example 5 without additive.

EXAMPLE 20

The battery separators of Examples 12 and 13 are separately assembled in 12-volt batteries. The batteries are subjected to 350 charge discharge cycles. They are then disassembled. The separators of Example 13 are smoother in appearance and show significantly less erosion than those of separators of Example 12. Moreover, the separators of Example 13 are appreciably less perforated than those of Example 12.

Changes may be made in carrying out the above process and in the composition set forth without departing from the scope of this invention.

What is claimed is:

1. A cellulosic permeable battery separator which comprises a cellulosic substrate thoroughly impregnated with a resin composition to impart improved oxidation resistance, wherein the resin composition comprises a resole of number average molecular weight in the range of 130 to 300 and an aldehyde to phenol molar ratio in the range of 1.94 to 2.45 and an anti-migratory agent for reducing the degree of migration of the resin composition in the cellulosic substrate during drying and curing, wherein the anti-migratory agent is selected from the group consisting of ethylene glycol, glycerol, and sorbitol, wherein the weight ratio of resole to anti-migratory agent is in the range of 100:7 to 100:32, and wherein the resole is advanced to an infusible state.

2. The battery separator of claim 1 wherein the weight ratio of resole to cellulose substrate is between 1:4 and 1:1.

3. The battery separator of claim 1 wherein the cellulosic substrate has a Gurley porosity of about 1 to 25 seconds measured with a 5-ounce cylinder and a one-fourth square inch orifice.

4. The battery separator of claim 1 wherein the resole is the reaction product of formaldehyde and phenol.

5. The battery separator of claim 1 wherein the anti-migratory agent is ethylene glycol.

6. A cellulosic permeable battery separator which comprises a cellulosic substrate, thoroughly impregnated with a resin composition to impart improved oxidation resistance, wherein the resin composition comprises a phenol-formaldehyde resole of number average molecular weight in the range of 130 to 300 and an aldehyde to phenol molar ratio in the range of 1.94 to 2.45 and an anti-migratory agent for reducing the degree of migration of the resin composition in the cellulosic substrate during drying and curing, wherein the anti-migratory agent is selected from the group consisting of ethylene glycol and glycerol, wherein the weight ratio of resole to anti-migratory agent is in the range of 100:9 to 100:16, wherein the resole is advanced to an infusible state, wherein the weight ratio of resole to cellulosic substrate is in the range of 1:4 to 1:1 and wherein the cellulosic substrate has a Gurley porosity of about 1 to 25 seconds measured with a 5-ounce cylinder and a one-fourth square inch orifice.

7. A resin composition for impregnation of cellulosic substrates to provide improved oxidation resistance comprising in admixture a resole and an anti-migratory agent for reducing the degree of migration of the resin composition in the cellulosic substrate during drying and curing, wherein the anti-migratory agent is selected from the group consisting of ethylene glycol, glycerol, and sorbitol wherein the resole has a number average molecular weight in the range of 130 to 300 and an aldehyde to phenol molar ratio in the range of 1.94 to 2.45, and wherein the weight ratio of resole to anti-migratory agent is in the range of 100:7 to 100:32.

8. The resin composition of claim 7 wherein the resole is the reaction product of formaldehyde and phenol.

9. The resin composition of claim 7 wherein the anti-migratory agent is ethylene glycol.

10. A process for the manufacture of a cellulosic battery separator of improved oxidation resistance comprising:

A. preparing a resin admixture comprising an anti-migratory agent for reducing the degree of migration selected from the group consisting of ethylene glycol, glycerol and sorbitol, and a resole resin of number average molecular weight in the range of 130 to 300, and an aldehyde to phenol molar ratio in the range of 1.94 to 2.45, wherein the weight ratio of resole to anti-migratory agent is in the range of 100:7 to 100:32, B. impregnating a cellulose substrate with the resin admixture, and C. heating the impregnated substrate to advance the resole to the infusible stage.

11. A process for the manufacture of a cellulose battery separator comprising:

A. swelling a cellulosic substrate with a swelling agent selected from the group consisting of ethylene glycol, glycerol and sorbitol B. impregnating the swollen cellulosic substrate with a resole of molecular weight in the range of 130 to 300 and an aldehyde to phenol mol ratio in the range of 1.94 to 2.45, and C. heating the impregnated substrate to advance the resole to the infusible stage.

\* \* \* \* \*